(12) United States Patent
Xu et al.

(10) Patent No.: US 9,240,670 B2
(45) Date of Patent: Jan. 19, 2016

(54) OPTICAL PULSE SOURCE WITH INCREASED PEAK POWER

(75) Inventors: Jingzhou Xu, Ann Arbor, MI (US); Gyu Cheon Cho, Ann Arbor, MI (US)

(73) Assignee: IMRA AMERICA, INC., Ann Arbor, MI (US)

(*) Notice: Subject to any disclaimer, the term of this patent is extended or adjusted under 35 U.S.C. 154(b) by 465 days.

(21) Appl. No.: 13/413,304

(22) Filed: Mar. 6, 2012

(65) Prior Publication Data

US 2012/0230353 A1 Sep. 13, 2012

Related U.S. Application Data

(60) Provisional application No. 61/449,955, filed on Mar. 7, 2011.

(51) Int. Cl.
*H01S 3/23* (2006.01)
*H01S 3/00* (2006.01)
(Continued)

(52) U.S. Cl.
CPC ............. *H01S 3/2383* (2013.01); *H01S 3/0057* (2013.01); *H01S 3/0092* (2013.01); *H01S 3/06712* (2013.01); *H01S 3/10061* (2013.01); *H01S 3/2308* (2013.01); *H01S 3/302* (2013.01)

(58) Field of Classification Search
CPC . H01S 3/0057; H01S 3/0092; H01S 3/10061; H01S 3/06712; H01S 3/2308; H01S 3/2383; H01S 3/302
USPC ............................................................ 372/6
See application file for complete search history.

(56) References Cited

U.S. PATENT DOCUMENTS 5,167,444 A * 12/1992 Hall ................................ 385/15
6,339,602 B1    1/2002 Goto
(Continued)

FOREIGN PATENT DOCUMENTS

| CN | 101174905 A | 5/2008 |
| WO | 2009/146671 A1 | 12/2009 |
| WO | 2011062842 A1 | 5/2011 |

OTHER PUBLICATIONS

Strickland and G. Mourou, "Compression of Amplified Chirped Optical Pulses", Opt. Comm. 56, 219 (1985).
(Continued)

*Primary Examiner* — Xinning Niu
(74) *Attorney, Agent, or Firm* — Sughrue Mion, PLLC; Richard C. Turner

(57) ABSTRACT

In at least one embodiment time separated pulse pairs are generated, followed by amplification to increase the available peak and/or average power. The pulses are characterized by a time separation that exceeds the input pulse width and with distinct polarization states. The time and polarization discrimination allows easy extraction of the pulses after amplification. In some embodiments polarization maintaining (PM) fibers and/or amplifiers are utilized which provides a compact arrangement. At least one implementation provides for seeding of a solid state amplifier or large core fiber amplifier with time delayed, polarization split pulses, with capability for recombining the time separated pulses at an amplifier output. In various implementations suitable combinations of bulk optics and fibers may be utilized. In some implementations wavelength converted pulse trains are generated. A method and system of the present invention can be used in time domain applications utilizing multiple beam paths, for example spectroscopy.

53 Claims, 5 Drawing Sheets

(51) Int. Cl.
*H01S 3/067* (2006.01)
*H01S 3/30* (2006.01)
*H01S 3/10* (2006.01)

(56) References Cited

U.S. PATENT DOCUMENTS

| | | |
|---|---|---|
| 6,664,498 B2 | 12/2003 | Forsman |
| 6,954,575 B2 | 10/2005 | Fermann |
| 7,088,878 B2 | 8/2006 | Waggard |
| 7,414,780 B2 | 8/2008 | Fermann |
| 7,580,432 B2 | 8/2009 | Sucha |
| 2002/0167581 A1 | 11/2002 | Cordingley |
| 2003/0151053 A1 | 8/2003 | Sun |
| 2004/0126048 A1* | 7/2004 | Dave et al. ............ 385/11 |
| 2005/0018714 A1 | 1/2005 | Fermann |
| 2005/0218122 A1 | 10/2005 | Yamamoto |
| 2005/0226287 A1 | 10/2005 | Shah |
| 2006/0120418 A1 | 6/2006 | Harter |
| 2006/0222372 A1* | 10/2006 | Spinelli et al. ......... 398/183 |
| 2009/0080883 A1* | 3/2009 | Granot et al. ............ 398/34 |
| 2009/0201575 A1* | 8/2009 | Fermann et al. ........ 359/341.32 |
| 2010/0040095 A1* | 2/2010 | Mielke et al. ............ 372/25 |
| 2010/0142034 A1 | 6/2010 | Wise et al. |
| 2010/0272129 A1* | 10/2010 | Harter et al. ............ 372/6 |
| 2010/0272137 A1 | 10/2010 | Kopf |
| 2011/0122407 A1 | 5/2011 | Jalali et al. |

OTHER PUBLICATIONS

H. Hofer et. al., "High-power 100 fs pulse generation by frequency doubling of an erbium—ytterbium-fiber master oscillator power amplifier", Opt. Lett. 23, 1840 (1998); IMRA paper.

M.E. Fermann et al., "Self-Similar Propagation and Amplification of Parabolic Pulses in Optical Fibers", Phys. Rev. Lett., 84, 2000 (6010).

International Search Report and Written Opinion dated Aug. 16, 2012 issued in corresponding PCT Application No. PCT/US 12/26748.

Yen et al., "Programmable Group-Delay Module Using Binary Polarization Switching", Journal of Lightwave Technology, vol. 21, No. 7, pp. 1676-1684, Jul. 2003.

Notice of First Office Action, dated Nov. 9, 2015; Application No. 201280010993; Title: Optical Pulse Source With Increased Peak Power.

* cited by examiner

OPTICAL PULSE SOURCE WITH INCREASED PEAK POWER

FIELD OF THE INVENTION

The invention relates to methods and systems for generating laser pulses with high average power or high peak power, and is particularly applicable to time-domain spectroscopy such as pump-probe or terahertz measurement, where multiple beams carrying pulse trains are to be utilized, or where average power and/or pulse energy can be provided without undesirable nonlinear effects.

BACKGROUND

Utilization of pulsed laser sources has increased in industrial and scientific applications. In particular, applications of ultrashort laser technology have increased over the last few years in metrology, imaging and material processing applications. Fiber-based ultrashort systems are now well established for numerous applications, and are particularly well suited for high repetition rate applications at low-medium pulse energy. However, in either passive or gain fiber, the peak power of the amplified pulse is constrained because of the pulse distortion and signal shifting out of the gain spectrum caused by nonlinear effects, for example Raman shifting. Chirped pulse amplification is often used to greatly extend the capability of fiber systems. Pulses are temporally stretched, thereby lowering the peak power, then amplified and recompressed. Such constraints also apply to other optical media as the pulse energy scales up, for example Nd:based bulk optical amplifiers.

The following patents, published patent applications, and publications relate, at least in part, to fiber lasers and amplifiers, ultrashort laser material processing, optical measurement techniques, and/or various arrangements for generating groups of laser pulses: U.S. Pat. No. 6,339,602; U.S. Pat. No. 6,664,498; U.S. Pat. No. 6,954,575; U.S. Pat. No. 7,088,878; U.S. Pat. No. 7,580,432; U.S. Patent Application Pub. No. 2002/0167581; U.S. Patent Application Pub. No. 2003/0151053; U.S. Patent Application Pub. No. 2005/0218122; U.S Patent Application Pub. No. 2010/0272137; WIPO Pub. No. 2009146671; Strickland and G. Mourou, Opt. Commun. 56, 219 (1985)., H. Hofer et. al., Opt. Lett. 23, 1840 (1998); M. E. Fermann et al., Phys. Rev. Lett., 84, 2000 (2010).

Various applications require multiple beams or pulse trains. In such applications, pulses in the multiple beams may have a well-defined relative time interval, requiring some level of synchronization. Time domain measurements are an example. More specifically, with optical time gating or correlation techniques, a first beam is used for optical interaction with a sample, and a second beam is used for a time gating or correlation function. Specifically, for an ultrashort measurement, synchronization is needed to obtain the desired time resolution. Terahertz spectroscopy, optical pump-probe spectroscopy and other time gated imaging processes utilizing an ultrashort pulse laser fall into this application category.

Conventional laser-based systems used for such applications are often designed to create pulses with sufficiently high energy, and to subsequently divide the beam into multiple beam paths in the application system.

Amplification of high intensity optical pulses in an optical fiber and other gain media, for example regenerative amplifiers, ultimately requires consideration of nonlinearity. Often the pulse energy constraint results in limited average power. Increasing the average power without loss of pulse energy would be a useful improvement for high peak power pulse laser systems.

Therefore, a need exists to extend the peak power capability of pulsed laser sources, including fiber based systems, regenerative amplifiers, thin disk lasers, and the like.

SUMMARY OF THE INVENTION

In one aspect the present invention features a method to reduce nonlinear pulse distortion and to increase the available average power of a pulsed laser source.

Amplifying pulses distributed in the time domain reduces nonlinear effects which would otherwise be induced by high peak power. If the time distributed pulses have different polarization states, the pulses can be easily separated.

In various embodiments a pulse is split into distinct polarization states prior to or during amplification. The resulting split pulse portions may have orthogonally linear polarizations. The distinct polarization states provide for easy extraction of the synchronized pulse trains into multiple beams utilizing relatively simple polarization sensitive devices. A time separation between pulse pairs can be introduced during propagation in an optical medium, with time separation being greater than a pulse width.

In some embodiments a second splitting unit may be used to recombine two polarization split, time separated pulses by propagating a beam in an opposite direction to compensate the time delay. In some implementations the second splitting unit may include the same optical components as the first unit.

In various embodiments, polarization split, time separated pulses are generated in an active medium before the pulses are amplified to a threshold at which unwanted nonlinear effects occur.

In at least one embodiment pulses are temporally split prior to amplifying with one or more amplifier stages.

In at least one embodiment both the polarization splitting and delay generation are implemented in an all-fiber arrangement, which may include active or passive polarization maintaining (PM) fiber. For example, with PM optical fiber, a polarization splitter and delay generator may be integral with an active/passive PM fiber medium and not require separate components.

In a fiber laser configuration the oscillator output can be separated into two or more beams, with an optional delay stage for each beam path, before being combined and injected into the amplifier fiber. If sufficient delay is provided beyond the pulse width of the pulse then the pulses are amplified without interference, thereby preserving the duration of each pulse.

In various embodiments utilizing linearly polarized pulses, the split beams may be manipulated so that the polarization is linear but with orthogonal polarization states. After amplification in a gain medium, a polarization sensitive device can easily separate the pulses for subsequent operations. In various embodiments utilizing fiber lasers with polarization maintaining fibers, the splitting in time and polarization can be further simplified by utilizing the group velocity difference of the two orthogonally linear polarized pulses in the fiber. In this example, the input polarization to the PM fiber is set so that slow and fast axis polarizations are simultaneously excited. After a sufficient propagation length in the fiber the pulses in the two polarization components will be separated, preferably by more than the pulse width of the input pulse. At least two amplified pulse trains can then be extracted by a polarization component.

In at least one embodiment, the two laser pulses can be coherently or incoherently combined to generate a single laser pulse with higher peak power output than a non-linear threshold of at least one medium.

In at least one embodiment, laser pulse trains in both polarization states, or in one polarization state, can be input to an optical nonlinear device to convert a first wavelength to a second wavelength.

In one application the laser output comprises two physical beams, and the corresponding pulse trains are synchronized. Non-limiting examples of applications include polarization based material modification and processing, time domain spectroscopy and imaging based on the time domain information, and the like.

DETAILED DESCRIPTION

In at least one embodiment the available average output power of an amplifier is increased without substantial increase of pulse energy.

In at least one embodiment one pulse is split into a pair of pulses, each having a different polarization state. A relative delay between the polarization split pulses is generated and temporally separates the pulses during propagation in a medium, for example a passive optical material or an active, amplifying gain medium. In some embodiments the pulses may separate, at least in part, during amplification in a gain medium.

Some pulsed laser sources, such as fiber laser amplifiers utilizing PM fibers, preserve the polarization states. When excitation is sufficient, each polarization state can independently propagate in the laser source.

Figure 1A:
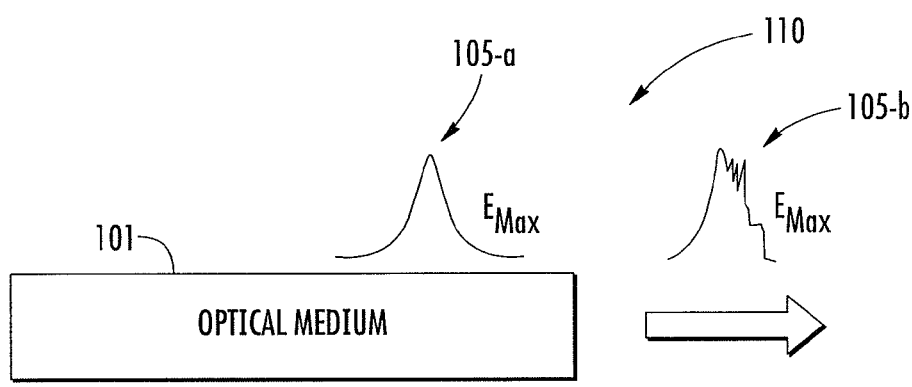
FIG. 1a schematically illustrates conventional pulse propagation in a medium which results in pulse distortion.
Figure 1B:
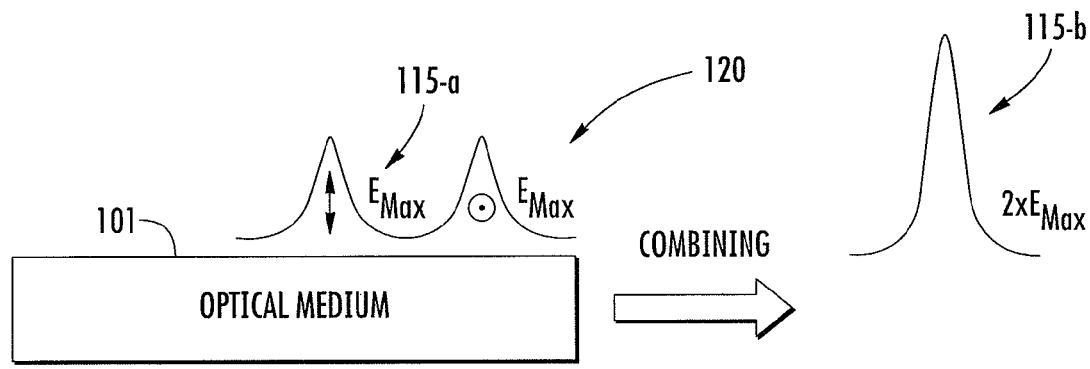
FIG. 1b schematically illustrates time separated pulses with different polarization states in the medium and pulses being combined into a single output beam with higher power or pulse energy, and negligible distortion.

By way of example, FIGS. 1a and 1b compare pulse propagation 110 in a medium of a conventional laser system with propagation 120 of time separated pulses in accordance with one implementation of the present invention. FIG. 1a shows a laser pulse 105a propagating in a portion of medium 101, which can be a gain medium or a passive medium. This example illustrates output pulse distortion 105-b induced by nonlinear effects within the medium. Such effects may be manifested by pulse breakup, noise, and other distortion. As discussed above, distortion levels caused by non-linear effect(s) constrain the achievable peak power for various laser-based applications. It is known that Raman shifting and/or self-phase modulation can significantly transform a Gaussian-like input pulse to a substantially distorted temporal pulse shape similar to 105-b, for example. Non-linear effects have been exploited to improve pulse quality, for example as disclosed in U.S. Pat. No. 7,414,780, where output pulse quality was improved with an increase in self-phase modulation. Nevertheless, further increase in the available peak power is beneficial in such a system, at a power level when substantial degradation of output pulse quality is observed.

FIG. 1b schematically illustrates how laser pulses with orthogonal polarizations 115-a can be used to double the available output maximum pulse energy in a pulsed laser system. As schematically illustrated in FIGS. 1a and 1b, an output pulse 115-b having increased peak power may have a pulse temporal shape similar to the temporal shape of a pulse 105-a generated with the seed source, e.g.: prior to a time and location at which the input (seed) pulse becomes distorted. If two laser pulses with orthogonal polarization are temporally separated prior to or during propagation in the medium 101, each pulse can separately reach the maximum pulse energy supported by the medium before onset of non-linear effects. With pre-determined beam profile and pulse shape, the maximum pulse energy can be determined. An optional combiner after the medium 101 compensates the temporal delay between these two pulses, and combines the two pulses into a single pulse. A resultant pulse 115-b has twice the maximum energy of a single pulse (before separation into the pulse pair).

Figure 2:
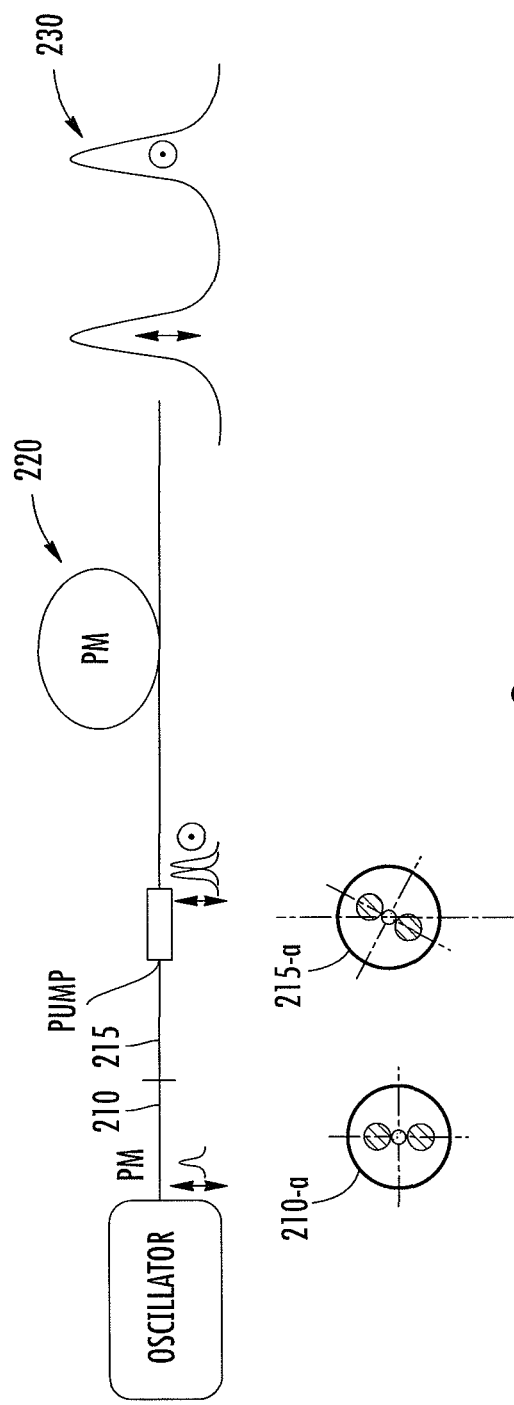
FIG. 2 schematically illustrates an example of a pulsed laser source utilizing PM fibers.

FIG. 2 illustrates one example of the polarization splitting and combining operation in an exemplary fiber-based laser system. In this example, the laser source includes a seed laser, which may include a mode locked laser oscillator coupled to PM fiber. In this configuration the seed has a pure linear polarized output, depicted with the vertical arrow. The seed laser is configured to provide laser pulse trains with ultrashort pulses. The pulse trains are amplified with a laser amplifier 220 having a doped gain fiber as a gain medium, also based on PM fiber One efficient way to split each seed pulse into two orthogonal polarization states is to arrange PM fiber by splicing two sections of PM fiber 210, 215 between the seed source and the amplifier 220 with an angular shift. Schematic cross sectional views 210-a, 215-a illustrate the relative angular displacement of the PM fiber polarization axes. The axes are determined, at least in part, by the birefringent material disposed in the fiber cladding which partially surrounds the fiber core. Such splicing may be carried out automatically with commercially available splicing machines and software.

Assume polarization of the seed laser is parallel to the slow axis of the input fiber. Then, with an angular shift of $\theta$, the power in the fast axis and the slow axis of the output fiber are $I_0 \cos^2\theta$, and $I_0 \sin^2\theta$, respectively. In this particular example, the temporal delay between these two polarization states is applied by the PM fiber in an amplifier portion of the pulsed laser system. The PM fiber has birefringence $\delta n$ on the order of $10^{-4}$ between its fast and slow axes. This results a temporal delay from a few hundreds of femtosecond (fs) to about a picosecond (ps) in each meter of PM fiber. If the amplifier portion has a PM fiber length of a few meters, several ps of temporal delay results. This temporal delay is usually sufficient to separate two ultrashort pulses.

Notably, in this example, the temporal delay between the pulses of a pulse pair varies in the laser amplifier 220 and two pulses completely separate near the end portion of the amplifier. This variable delay is not detrimental because laser power increases during the propagation along with the separation. Thus, although the pulse is not temporally separated immediately upon injection to the amplifier, the total power of each pulse is still below the maximum peak power because both pulses have reduced pulse energy, and the pulses separate before the sum of the pulse powers exceeds a threshold for non-linear effects. Maximum pulse separation is to be obtained at or near the output end of the amplifier, where the polarization split, time delayed amplified pulses 230 have maximum energy.

It is to be understood that FIG. 2 illustrates one of many possible implementations. For example, the seed laser may not be linearly polarized, it can be in other polarization states, such as circularly polarized, elliptically polarized, or even non-polarized, depolarized or partially polarized. In various embodiments a seed pulse in a pure polarization state is more desirable for controlling the ratio between two orthogonal polarization states in the amplifier, and well suited for coherent combining after amplification. The required temporal separation need not occur in a laser amplifier. The separation can also be applied in a passive medium, laser oscillator, and/or amplifier, In various implementations the polarization splitting can be done using free space coupling rather than fiber splicing. A polarization splitter may include a mechanism for relative rotation of a fiber or waveplate to further control and align the polarization. A delay can also be set using bulk optical components as will be discussed below with respect to FIG. 3 and FIG. 4. Furthermore, a delay can be variable rather than fixed.

Moreover, the amplifier need not be a fiber amplifier. The medium can be any suitable medium, passive or active, which limits the maximum pulse energy, and may be disposed outside of the laser source itself.

Figure 3A:
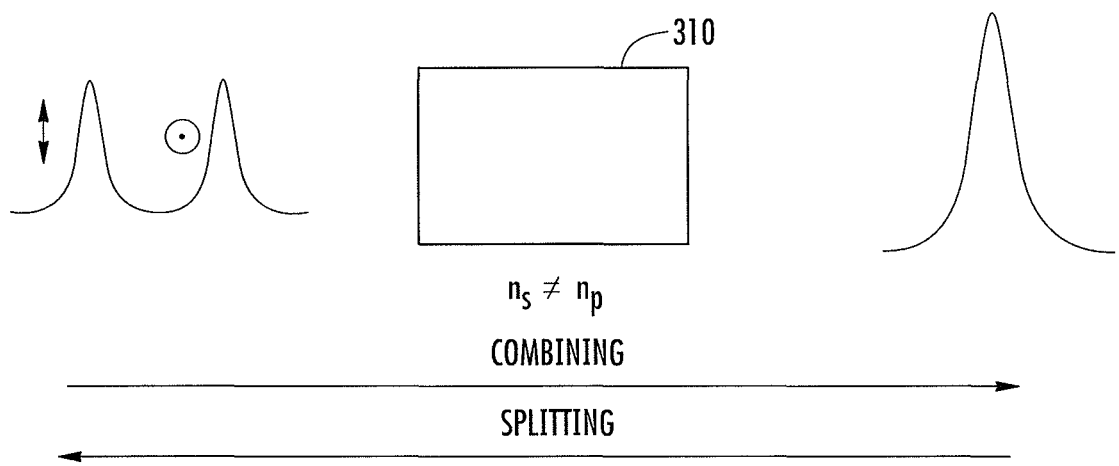
FIG. 3a schematically illustrates an example of a polarization splitting unit or combining unit.
Figure 3B:
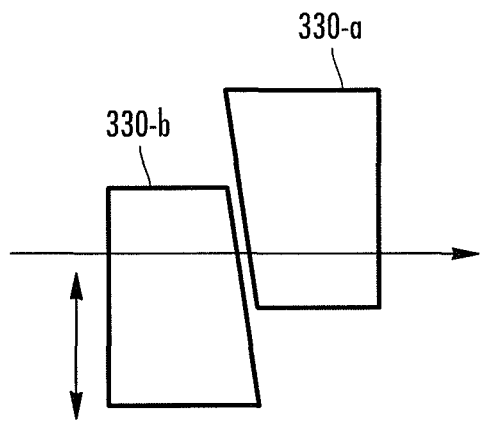
FIG. 3b schematically illustrates an example of a delay generator with controllable delay.

FIG. 3a illustrates an exemplary polarization splitting unit (or reciprocal combining unit with a reversed beam). A slab of birefringent crystal 310, which has different refractive indices ($n_s$, $n_p$) for the two orthogonal polarization states, can be used to split a pulse or combine polarization split, time separated pulse pairs. LiNbO$_3$, for example, has $\delta n$=0.085 between the ordinary and extraordinary polarization states. A 3.5 mm thick portion of LiNbO$_3$ can provide about 1 ps temporal delay between the pulse pair. As illustrated in FIG. 3b, crystals 330-a, 330-b, each having a prism shape, can change the optical path length, and thus control the temporal delay by translating one or both crystals.

Figure 4A:
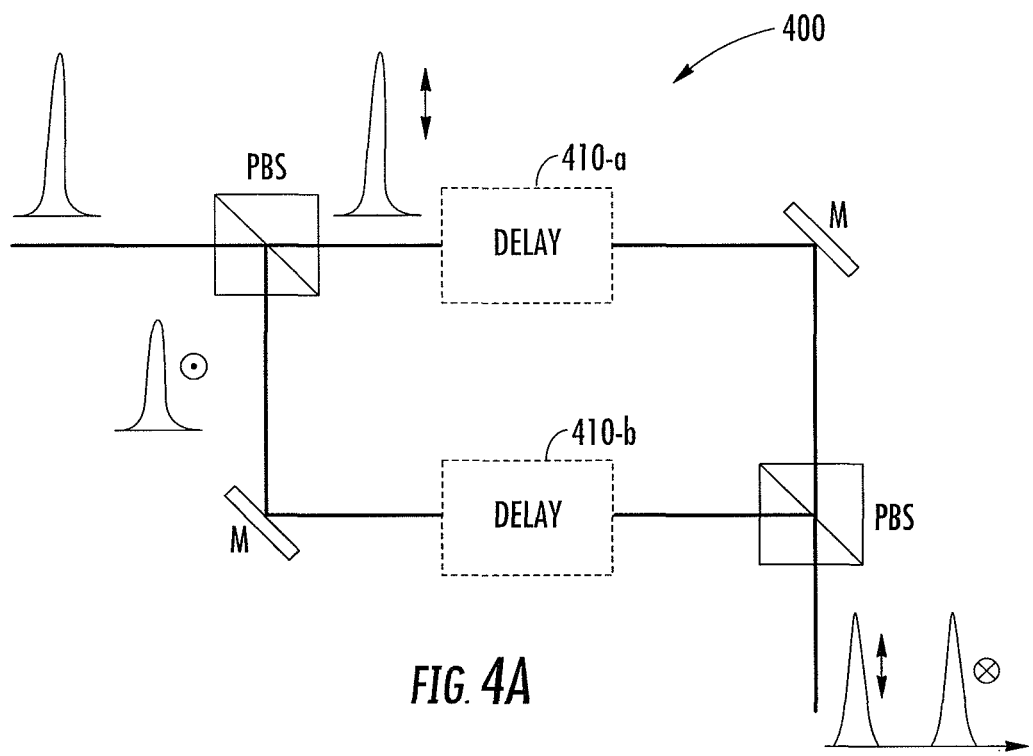
FIG. 4a schematically illustrates another example of a polarization splitter or reciprocal combiner.

FIG. 4a illustrates yet another example of a polarization splitting unit 400 (or reciprocal combining unit). A polarized beam splitter PBS is used to separate the laser pulse into different polarization states and direct them along different paths (arms). Delay generating units 410-a, 410-b are configured to control the temporal relationship between the pair of pulses.

Figure 4B:
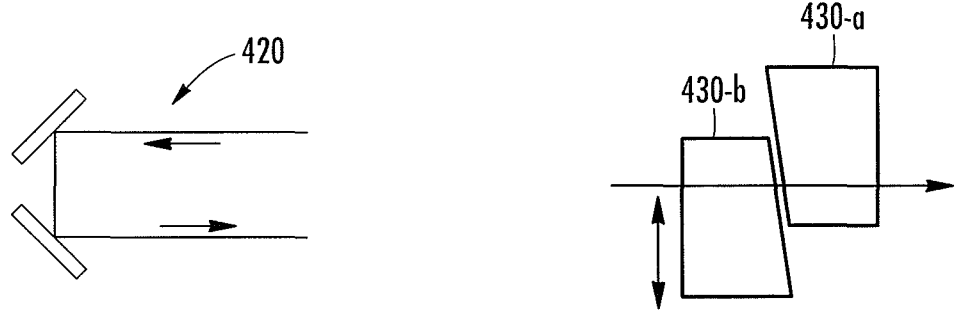
FIG. 4b schematically illustrates two examples of delay generators.

FIG. 4b illustrates two examples of devices suitable for delay generation. One is a linear delay line 420 and the other one comprises two prisms 430-a, 430-b, similar to the components illustrated in FIG. 3b, which can be used to control the optical path length. Such devices may be used alone or in combination. Also, although a two-fold increase in peak power is available with two pulses, additional paths may be used to form more than two time separated pulses in a desired time sequence, thereby providing for further increased output peak power.

The pulses may then be recombined in a combiner, which may comprise any suitable combination of bulk and fiber optics, for example as schematically illustrated in FIGS. 3-4.

As also discussed above, a reversed path may be used to combine the pulses in FIG. 4a.

By way of example, the output pulses may be used with suitable beam conditioning optics as an input to one or more of a downstream bulk solid state gain medium, a large mode multimode amplifier fiber (MMFA) capable of providing substantially fundamental mode output, large core leakage channel amplifier fiber (LCF design), photonic crystal amplifier fiber (PCF design), a high power coherent amplifier array, and/or other high peak power gain media. A combiner comprising bulk optics may be implemented at an output of the downstream gain medium to form a single pulse with increased peak power (not separately shown). Similarly, in various embodiments, the MMFA, LCF, or PCF may comprise PM fiber and provide at least a portion of the splitting and delay generation.

Moreover, various combinations of the above components and configurations may be utilized for any application where polarization split, time delayed pulse pairs can be advantageous to improve the peak and/average output power capability of an optical medium.

Figure 6:
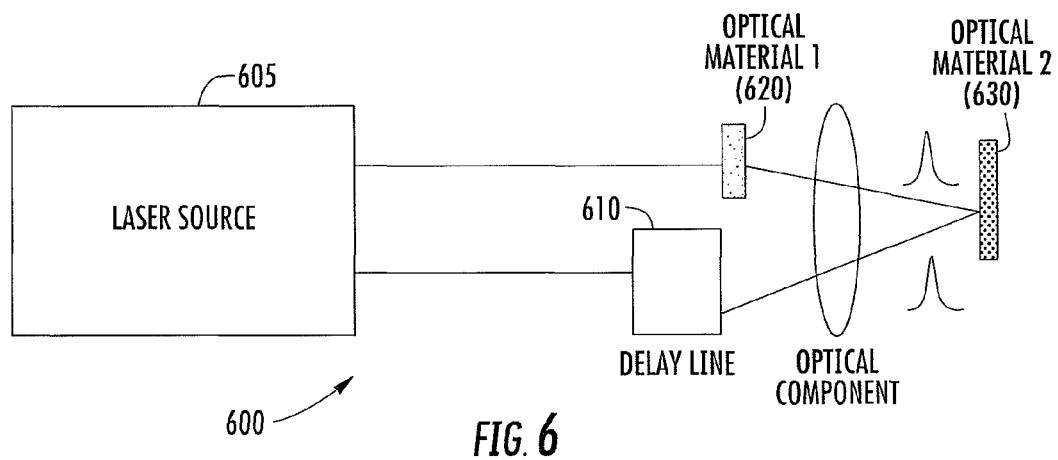
FIG. 6 illustrates an exemplary system for an application where two beams and two separate pulses are used to obtain time domain information.

Different beams and pulse trains can be used in a time domain measurement technique such as terahertz spectroscopy or pump and probe spectroscopy. A schematic illustration of a time domain measurement system 600 is shown in FIG. 6. A laser source 605 as discussed above delivers two beams and pulse trains, where one pulse train can be further delayed in time relative to the other pulse train via delay line 610. Sample 1 620 interacts with a first pulse train while the other pulse train interacts with the first pulse train in Sample 2 630.

By way of example, Sample 1 can be a terahertz emitter and Sample 2 the time gating element of the terahertz wave interacting with the gating pulse which is time delayed. Pump and probe or similar optical correlation techniques share a similar principle of operation, in which the time gating of the optical signal is induced in a sample.

In some embodiments one or both pulse trains may be wavelength converted. By way of example, a harmonic converter, a Raman shifter, or optical parametric amplifier (OPA) may be utilized for wavelength conversion. The resultant output may be combined and time synchronized, or processed separately. The wavelength converter may be disposed either before or after a beam combiner.

Figure 7:
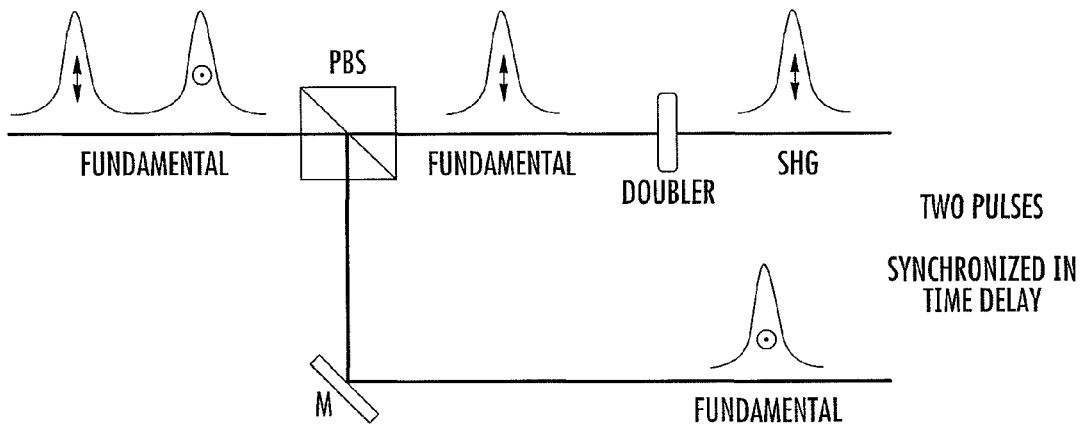
FIG. 7 schematically illustrates time separated, polarization split pulses in a plurality of optical paths and wavelength conversion of one or more pulses. A pre-determined time separation provides for synchronization.

FIG. 7 schematically illustrates a further application of two polarization split, time separated pulses. In this example, an input provides polarization split, time separated pulses as discussed above. The pulses are directed to separate optical paths. In a first optical path a pulse is frequency doubled with second harmonic generator SHG. The second pulse, propagating in a second optical path, may have a pre-determined delay and therefore can be time-synchronized with the frequency converted pulse. Many variations are possible, for example wavelength converting in the second optical path, combining, and the like.

In one experiment a Raman soliton laser amplifier was used in a configuration similar to that illustrated in FIG. 2. A mode locked fiber laser oscillator generated a central wavelength about 1560 nm, and was configured with a PM fiber pigtail. The output laser polarization was aligned with the slow axis. The seed pulse was injected into a laser amplifier by splicing the output PM pigtail to a PM gain fiber. 45 degree shifting was applied during splicing. Thus, equal power was split into the fast and slow axis in the laser amplifier. The gain fiber was pumped with a laser diode. In this example, a Raman soliton was formed during amplification. The output Raman soliton had pulse duration of about 100 fs. With only one polarization seed, the Raman soliton pulse energy saturated to maximum pulse energy. With two polarization seed inputs, each polarization produced a Raman soliton and saturated to the maximum pulse energy. As a result, the total Raman soliton power was doubled.

Figure 5:
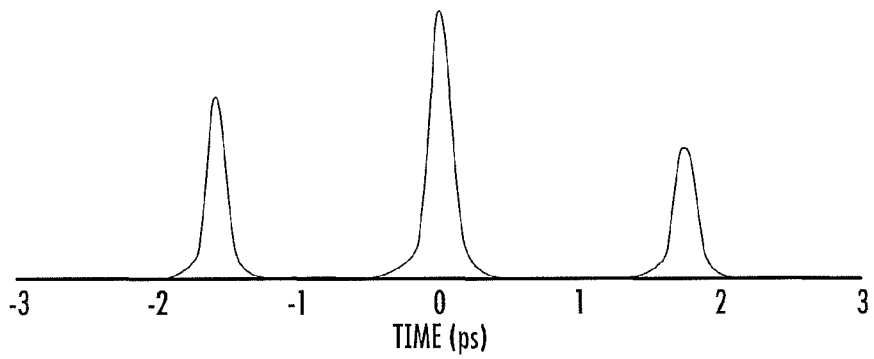
FIG. 5 is a plot showing a measured autocorrelation function (ACF).

FIG. 5 shows the measured autocorrelation function (ACF) of the amplified laser output. The ACF clearly shows a double pulse structure with 1.7 ps separation, which completely separates the pulse pair. It is possible if the Raman soliton were not used in the experiment, the time separation might have been slightly different due to the difference in group velocity dispersion of each polarization axis associated with the Raman generation process. However, such variation is not significant in demonstrating time separation of the pulses during the propagation in a PM fiber.

Thus, the invention has been described in several embodiments. It is to be understood that the embodiments are not mutually exclusive, and elements described in connection with one embodiment may be combined with, or eliminated from, other embodiments in suitable ways to accomplish desired design objectives.

At least one embodiment includes a pulsed laser system. The system includes a seed source for generating a pulse. A polarization splitter splits a pulse from the seed source into different polarization states, thereby forming polarization split pulses. A delay generator receives the polarization split pulses and generates time separated pulses, each pulse having a different polarization state. The system includes a medium in which the time separated pulses having the different polarization states propagate, wherein a peak power and energy of each of the time separated pulses are individually sufficiently low to avoid substantial distortion of a pulse output from the medium. The power of the time separated pulses, if combined in the medium, would exceed a non-linear threshold of the medium. A combiner receives the time separated pulses from the medium and substantially re-combines the time separated pulses to form an output pulse having increased peak power.

In any or all embodiments a medium may include a polarization splitter.

In any or all embodiments a medium may include a fiber gain medium.

In any or all embodiments a medium may include a polarization maintaining (PM) amplifier fiber.

In any or all embodiments a seed source may generate linearly polarized pulses.

In any or all embodiments a seed source may include a mode locked fiber oscillator.

In any or all embodiments at least a portion of a polarization splitter may include a polarization sensitive, bulk optic.

In any or all embodiments a delay generator and a polarization splitter may be coupled with optical fiber.

In any or all embodiments at least a portion of a delay generator may include an active or passive PM fiber.

In any or all embodiments a seed source may include a mode-locked fiber oscillator having at least one polarization maintaining (PM) fiber.

In any or all embodiments a polarization splitter or combiner may include at least one polarized beam splitter, which splits laser pulses with each polarization state into separate arms, and a delay generator disposed in at least one arm.

In any or all embodiments a pulse width generated by the seed source may be shorter than the time spacing between adjacent, time separated pulses.

In any or all embodiments a medium may include a plurality of PM fibers, including at least one active PM fiber.

In any or all embodiments an active fiber may include a multimode amplifier fiber capable of providing a substantially fundamental mode output, a leakage channel amplifier fiber, a photonic crystal amplifier fiber, or a combination thereof.

In any or all embodiments an active fiber may be capable of Raman soliton generation with multiple polarization states.

In any or all embodiments a wavelength of a seed source or Raman soliton wavelength may be in an anomalous dispersion regime.

In any or all embodiments a medium may include a bulk, solid state or a regenerative amplifier gain medium.

In any or all embodiments a polarization splitter may include PM fiber configured such that an input beam to the polarization splitter is coupled into both the fast and slow axes of the PM fiber.

In any or all embodiments an input beam may be coupled to the PM fiber via fiber splicing, and the polarization splitting may be controlled by angular offset in the splicing.

In any or all embodiments a polarization splitter may be controllable with relative rotation of a fiber or waveplate.

In any or all embodiments a seed pulse or output pulse may have a pulse width in the fs-ps regime.

In any or all embodiments a medium may include an amplifier fiber, and a seed beam may be coupled into the amplifier fiber with at least one bulk optical element and free space coupling.

In any or all embodiments a medium may include an amplifier fiber, and a seed beam may be coupled into the amplifier fiber with fusion splicing, and polarization splitting may be controlled by angle offset in splicing.

In any or all embodiments the medium may include a gain medium, and a delay between pulses in different polarization states may be comparable or larger than a pulse duration in the gain medium.

In any or all embodiments a medium may include an amplifier fiber, and a delay between laser pulses may be longer than the laser pulse width in at least in one portion of the laser amplifier.

In any or all embodiments a PM fiber may be configured as a delay generator, the PM fiber comprising one or both of active and passive fiber.

In any or all embodiments a medium may be capable of amplifying laser pulse trains with orthogonal polarization states, and capable of generating a Raman shift with the polarization states.

In any or all embodiments a Raman soliton may optionally be generated with orthogonal polarization states, in a laser amplifier.

In any or all embodiments a seed laser may produce a pulse width in the range from about 100 fs to a few ps, with a corresponding spectral bandwidth of at least a few nm.

In any or all embodiments at least one portion of a medium may include large mode area fiber comprising Yb/Er co-doped double cladding fiber with a core diameter of at least about 15 µm.

In any or all embodiments a polarization splitter and a delay generator may introduce delay larger than a pulse duration in the medium.

In any or all embodiments at least a portion of a combiner may be configured with identical components of a polarization splitter and a delay generator for reciprocal operation.

In any or all embodiments an output pulse having increased peak power may have a pulse temporal shape similar to the temporal shape of a pulse generated with the seed source.

In any or all embodiments a peak power and energy of each of the time separated pulses may be sufficiently low to avoid substantial distortion of a pulse during propagation in the medium and when output from the medium.

In any or all embodiments a pair of time separated pulses may be generated with a delay generator.

At least one embodiment includes a pulsed laser system. The system includes a seed source for generating a pulse. A polarization splitter splits a pulse from the seed source into different polarization states, thereby forming polarization split pulses. A delay generator receives the polarization split pulses and generates time separated pulses, each pulse having a different polarization state. The system includes a medium in which the time separated pulses having the different polarization states propagates, wherein a peak power and energy of each of the time separated pulses is sufficiently low to avoid substantial distortion of a pulse output from the medium. The power of the time separated pulses, if combined in the medium, would exceed a non-linear threshold of the medium. A bulk, solid state amplifier disposed downstream from the medium receives the time separated pulses therefrom, and generates amplified time separated pulses. The system includes a combiner that receives the amplified time separated pulses from the bulk, solid state amplifier and substantially re-combines the amplified time separated pulses to form an output pulse having increased peak power.

In any or all embodiments both of a polarization splitter and a delay generator may be configured with PM maintaining fibers.

In any or all embodiments a medium may include PM optical fiber, and a polarization splitter and a delay generator may be integral with the medium.

In any or all embodiments a medium may include at least one amplifier fiber.

In any or all embodiments at least one amplifier fiber may include single mode, polarization preserving fiber.

In any or all embodiments at least one amplifier fiber may include a multimode amplifier fiber capable of providing a substantially fundamental mode output, leakage channel amplifier fiber, a photonic crystal amplifier fiber, or a combination thereof.

In any or all embodiments at least one amplifier fiber may be capable of Raman soliton generation.

In any or all embodiments a polarization splitter, a delay generator, and a medium may include optical fiber and no bulk optical components.

In any or all embodiments a pair of time separated pulses may be generated with a delay generator.

At least one embodiment includes a pulsed laser system. The system includes a seed source for generating a pulse. A polarization splitter splits a pulse from the seed source into different polarization states, thereby forming polarization split pulses. A delay generator receives the polarization split pulses and generates time separated pulses, each pulse having a different polarization state. The system includes an optical amplifier in which the time separated pulses having the different polarization states propagates, wherein a peak power and energy of each of the time separated pulses is sufficiently low to avoid substantial distortion of a pulse output from the optical amplifier. The power of the time separated pulses, if combined in the optical amplifier, would exceed a non-linear threshold of a gain medium of the optical amplifier. The optical amplifier generates amplified time separated pulses as an amplifier output. The system includes a combiner that receives the amplified time separated pulses from the optical amplifier and substantially re-combines the amplified time separated pulses to form an output pulse having increased peak power.

In any or all embodiments an optical amplifier may include at least one fiber amplifier.

In any or all embodiments an optical amplifier may include a large core amplifier configured as one or more of a multimode fiber amplifier (MMFA) capable of providing a substantially fundamental mode output, a leakage channel fiber amplifier (LCF), a photonic crystal fiber amplifier (PCF), or a combination thereof.

In any or all embodiments a bulk solid state amplifier may be disposed between the optical amplifier and the combiner.

In any or all embodiments an output pulse having increased peak power may have a pulse temporal shape similar to the temporal shape of a pulse generated with the seed source.

In any or all embodiments a peak power and energy of each time separated pulse may be sufficiently low to avoid substantial distortion of a pulse during propagation in the medium and when output from the medium.

In any or all embodiments a pair of time separated pulses may be generated with a delay generator.

At least one embodiment includes a pulsed laser system. The system includes an input providing time separated pulses, each pulse having a different polarization state. The system includes a medium in which the time separated pulses propagates, wherein a peak power and energy of each of the time separated pulses is sufficiently low to avoid substantial distortion of a pulse output from the medium. The system is further configured such that the time separated pulses propagate in separate optical paths, thereby providing for synchronization of time separated pulses.

In any or all embodiments a wavelength converter may be disposed in a first optical path and receives a first pulse from the medium, and converts the wavelength of the first pulse from the medium to a first converted wavelength.

In any or all embodiments a second wavelength converter may be disposed in a second optical path and receives a second pulse from the medium, and converts the wavelength of the second pulse from the medium to a second converted wavelength.

In any or all embodiments an input may include a gain medium comprising substantially all-fiber and no bulk optical components in the gain medium.

In any or all embodiments an input may include a delay generator, and at least a portion of a delay generator may include bulk optics.

In any or all embodiments bulk optics may include a pair of prism-shaped birefringent crystals, wherein the thickness and/or relative position of one or both prism-shaped crystals provides for adjustable delay.

At least one embodiment includes a pulsed laser system. The system includes a means for generating time separated pulses, each pulse having a different polarization state. The system includes a medium in which the plurality of time separated pulses propagates, wherein a peak power and energy of each of the time separated pulses is sufficiently low to avoid substantial distortion of a pulse output from the medium, wherein the system is configured such that the time separated pulses propagate in separate optical paths, thereby providing for synchronization of time separated pulses.

In any or all embodiments the means for generating and at least a portion of the medium may include optical fiber and no bulk optical components.

In any or all embodiments the power of time separated pulses, if combined in the medium, may exceed a non-linear threshold of the medium.

In any or all embodiments an output pulse having increased peak power may have a pulse temporal shape similar to the temporal shape of a pulse generated with the seed source.

In any or all embodiments a peak power and energy of each time separated pulse may be sufficiently low to avoid substantial distortion of pulses during propagation in the medium and when output from the medium.

Thus, while only certain embodiments have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A pulsed laser system, comprising:
   a seed source generating a pulse;
   a polarization splitter to split said pulse into different polarization states, thereby forming polarization split pulses;
   a delay generator which receives said polarization split pulses and generates time separated pulses, said delay generator configured to control a temporal relationship between said polarization split pulses and to provide a temporal delay therebetween, each pulse having a different polarization state;
   a single medium in which said time separated pulses having said different polarization states propagate, wherein a peak power and energy of each of said time separated pulses is sufficiently low to avoid substantial distortion of a pulse output from said medium, wherein the power of the time separated pulses, if combined in said medium without said temporal delay, would exceed a non-linear threshold of said medium; and
   a combiner that receives said time separated pulses from said medium and substantially re-combines the time separated pulses and compensates said temporal delay to form an output pulse having increased peak power.

2. The pulsed laser system of claim 1, wherein said medium comprises said polarization splitter.

3. The pulsed laser system of claim 1, wherein said medium comprises a fiber gain medium.

4. The pulsed laser system of claim 1, wherein said medium comprises a polarization maintaining (PM) amplifier fiber.

5. The pulsed laser system of claim 1, wherein said seed source generates linearly polarized pulses.

6. The pulsed laser system of claim 1, wherein said seed source comprises a mode locked fiber oscillator.

7. The pulsed laser system of claim 1, wherein at least a portion of said polarization splitter comprises a polarization sensitive, bulk optic.

8. The pulsed laser system of claim 1, wherein said delay generator and said polarization splitter are coupled with optical fiber.

9. The pulsed laser system of claim 8, wherein at least a portion of said delay generator comprises an active or passive PM fiber.

10. The pulsed laser system of claim 1, wherein said seed source comprises a mode-locked fiber oscillator having at least one polarization maintaining (PM) fiber.

11. The pulsed laser system of claim 1, wherein said polarization splitter or combiner comprises at least one polarized beam splitter, which splits laser pulses with each polarization state into separate arms, and a delay generator disposed in at least one arm.

12. The pulsed laser system of claim 1, wherein a pulse width generated by the seed source is shorter than the temporal delay between adjacent time separated pulses.

13. The pulsed laser system of claim 1, wherein said medium comprises a plurality of PM fibers, including at least one active PM fiber.

14. The pulsed laser system of claim 13, wherein said active fiber comprises a multimode amplifier fiber capable of providing a substantially fundamental mode output, a leakage channel amplifier fiber, a photonic crystal amplifier fiber, or a combination thereof.

15. The pulsed laser system of claim 13, wherein said active fiber is capable of Raman soliton generation with multiple polarization states.

16. The pulsed laser system of claim 1, wherein a wavelength of said seed source or Raman soliton wavelength is in an anomalous dispersion regime.

17. The pulsed laser system of claim 1, wherein said medium comprises a bulk, solid state or a regenerative amplifier gain medium.

18. The pulsed laser system of claim 1, wherein said polarization splitter comprises PM fiber configured such that an input beam to the polarization splitter is coupled into both the fast and slow axes of the PM fiber.

19. The pulsed laser system of claim 18, wherein said polarization splitter is controllable with relative rotation of a fiber or waveplate.

20. The pulsed laser system of claim 1, wherein a seed pulse or output pulse has a pulse width in the fs-ps regime.

21. The pulsed laser system of claim 1, wherein said medium comprises an amplifier fiber, and a seed beam is coupled into amplifier fiber with at least one bulk optical element and free space coupling.

22. The pulsed laser system of claim 1, wherein said medium comprises an amplifier fiber, and delay between laser pulses is longer than the laser pulse width in at least in one portion of the laser amplifier.

23. The pulsed laser system of claim 1, wherein a PM fiber is configured as delay generator, said PM fiber comprising one or both of active and passive fiber.

24. The pulsed laser system of claim 1, wherein said medium is capable of amplifying laser pulse trains with orthogonal polarization states, and capable of generating a Raman shift with the orthogonal polarization states.

25. The pulsed laser system of claim 1, wherein a Raman soliton may optionally be generated with orthogonal polarization states, in a laser amplifier.

26. The pulsed laser system of claim 1, wherein said seed laser produces a pulse width in the range from about 100 fs to a few ps, with a corresponding spectral bandwidth of at least a few nm.

27. The pulsed laser system of claim 1, wherein at least one portion of said medium comprises large mode area fiber comprising Yb/Er co-doped double cladding fiber with a core diameter of at least about 15 μm.

28. The pulsed laser system of claim 1, wherein at least a portion of said combiner is configured with identical components of said polarization splitter and said delay generator for reciprocal operation.

29. A pulsed laser system, comprising:
   a seed source generating a pulse;
   a polarization splitter to split said pulse into different polarization states, thereby forming polarization split pulses;
   a delay generator which receives said polarization split pulses and generates time separated pulses, each pulse having a different polarization state;
   a single medium in which said time separated pulses having said different polarization states propagate, wherein a peak power and energy of each of said time separated pulses is sufficiently low to avoid substantial distortion of a pulse output from said medium, wherein the power of the time separated pulses, if combined in said medium, would exceed a non-linear threshold of said medium;

a bulk, solid state amplifier disposed downstream from said medium and receiving said time separated pulses therefrom, and generating amplified time separated pulses, wherein said combiner receives said amplified time separated pulses from said bulk, solid state amplifier and substantially re-combines the amplified time separated pulses from said bulk, solid state amplifier to form an output pulse having increased peak power.

30. The pulsed laser system of claim 29, wherein both of said polarization splitter and said delay generator are configured with PM maintaining fibers.

31. The pulsed laser system of claim 30, wherein said medium comprises PM optical fiber, and said polarization splitter and said delay generator are integral with said first medium.

32. The pulsed laser system of claim 29, wherein said medium comprises at least one amplifier fiber.

33. The pulsed laser system of claim 32, wherein said at least one amplifier fiber comprises single mode, polarization preserving fiber.

34. The pulsed laser system of claim 32, wherein said at least one amplifier fiber comprises a multimode amplifier fiber capable of providing a substantially fundamental mode output, leakage channel amplifier fiber, a photonic crystal amplifier fiber, or a combination thereof.

35. The pulsed laser system of claim 32, wherein said at least one amplifier fiber is capable of Raman soliton generation.

36. The pulsed laser system of claim 29, wherein said polarization splitter, said delay generator, and said medium comprise optical fiber and no bulk optical components.

37. A pulsed laser system, comprising:
a seed source generating a pulse;
a polarization splitter to split said pulse into different polarization states, thereby forming polarization split pulses;
a delay generator which receives said polarization split pulses and generates time separated pulses, said delay generator configured to control a temporal relationship between said polarization split pulses and to provide a temporal delay therebetween, each pulse having a different polarization state;
an optical amplifier in which said time separated pulses having said different polarization states propagate, wherein a peak power and energy of each of said time separated pulses is sufficiently low to avoid substantial distortion of a pulse output from said optical amplifier, wherein the power of the time separated pulses, if combined in said optical amplifier without said temporal delay, would exceed a non-linear threshold of a gain medium of said optical amplifier, wherein said amplifier generates amplified time separated pulses as an amplifier output; and
a combiner that receives the amplified time separated pulses from said optical amplifier and substantially re-combines the amplified time separated pulses from said amplifier and compensates said temporal delay to form an output pulse having increased peak power.

38. The pulsed laser system of claim 37, wherein said optical amplifier comprises at least one fiber amplifier.

39. The pulsed laser system of claim 37, wherein said optical amplifier comprises a large core amplifier configured as one or more of a multimode fiber amplifier (MMFA) capable of providing a substantially fundamental mode output, a leakage channel fiber amplifier (LCF), a photonic crystal fiber amplifier (PCF), or a combination thereof.

40. The pulsed laser system of claim 37, further comprising a bulk solid state amplifier disposed between said optical amplifier and said combiner.

41. The pulsed laser system of claim 1, wherein one or more of said polarization splitter or said delay generator are configured with polarization maintaining (PM) fibers.

42. A pulsed laser system, comprising:
a seed source generating a pulse;
a plurality of polarization maintaining (PM) optical fibers, at least two of said plurality of PM optical fibers configured with relative angular displacement between the PM fiber polarization axes so as to split said pulse into orthogonal polarization states;
a polarization maintaining (PM) optical amplifier propagating said polarization split pulses having said different polarization states and generating amplified pulses, wherein a time separation between said polarization split pulses is sufficient to limit peak power and energy of each of said polarization split pulses so as to avoid substantial distortion of a pulse output from said PM optical amplifier, wherein the power of said pulses having said time separation, if combined in said optical amplifier without said time separation, would exceed a non-linear threshold of said optical amplifier; and
a combiner that receives time separated amplified pulses from said PM optical amplifier and substantially re-combines the amplified pulses having said time separation and compensates said time separation to form an output pulse having increased peak power.

43. The pulsed laser system of claim 42, wherein said polarization maintaining optical amplifier is configured as a PM fiber amplifier.

44. The pulsed laser system of claim 43, wherein said plurality of PM fibers includes said PM fiber amplifier, configured as PM gain fiber having a gain medium.

45. The pulsed laser system of claim 42, wherein at least two PM fibers of said plurality of PM fibers are interconnected by splicing said at least two fibers.

46. The pulsed laser system of claim 42, wherein said time separation is in the range from about a few hundreds of femtoseconds(fs) to about 1 picosecond (ps) per meter of PM fiber, including any active PM fiber or passive PM fiber.

47. The pulsed laser system of claim 42, wherein said time separation increases in said PM optical amplifier such that a maximum time separation and increased time separation occur near an output end of said amplifier.

48. The pulsed laser system of claim 42, wherein said time separation is essentially zero immediately upon injection to the amplifier.

49. The pulsed laser system of claim 42, wherein said optical amplifier comprises a gain fiber, and an input pulse is coupled to said gain fiber via a splice.

50. The pulsed laser system of claim 42, wherein said optical amplifier comprises a large core amplifier configured as one or more of a multimode fiber amplifier (MMFA) capable of providing a substantially fundamental mode output, a leakage channel fiber amplifier (LCF), a photonic crystal fiber amplifier (PCF).

51. The pulsed laser system of claim 42, wherein said output pulse having increased output power is delivered as an input to one or more of a downstream bulk solid state gain medium, a large mode multimode amplifier fiber (MMFA) capable of providing substantially fundamental mode output, large core leakage channel amplifier fiber (LCF design), photonic crystal amplifier fiber (PCF design), a high power coherent amplifier array, and/or other high peak power gain media.

52. The pulsed laser system of claim 42, wherein said seed source provides linearly polarized, circularly polarized, and/or elliptically polarized seed pulses.

53. The pulsed laser system of claim 42, wherein said seed source provides non-polarized, depolarized, or partially polarized pulses.

* * * * *